(12) United States Patent
Mass et al.

(10) Patent No.: US 8,632,040 B2
(45) Date of Patent: Jan. 21, 2014

(54) LOW PROFILE MOUNTING OF ELECTRONIC DEVICES

(75) Inventors: James A. Mass, North Royalton, OH (US); Patanjali Peri, Copley, OH (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 12/770,477

(22) Filed: Apr. 29, 2010

(65) Prior Publication Data
US 2011/0265393 A1 Nov. 3, 2011

(51) Int. Cl.
*B42F 13/00* (2006.01)

(52) U.S. Cl.
USPC .............................. 248/343; 174/58; 248/342

(58) Field of Classification Search
USPC ............... 248/342, 343, 344; 174/50, 58, 63; 52/220.6, 220.7; 220/3.9, 3.92
See application file for complete search history.

(56) References Cited

U.S. PATENT DOCUMENTS

| | | | |
|---|---|---|---|
| 5,009,383 A * | 4/1991 | Chapman | 248/343 |
| 7,300,248 B2 * | 11/2007 | Wang | 416/5 |
| 7,381,893 B2 * | 6/2008 | Kerr, Jr. | 174/58 |
| 7,837,172 B2 * | 11/2010 | Johnson et al. | 248/343 |
| 7,952,022 B2 * | 5/2011 | Rippel et al. | 174/50 |
| 2003/0029983 A1 * | 2/2003 | Pfaller | 248/343 |
| 2005/0067546 A1 * | 3/2005 | Dinh | 248/343 |
| 2010/0314513 A1 * | 12/2010 | Evans et al. | 248/217.4 |
| 2011/0315409 A1 * | 12/2011 | Silcox et al. | 169/51 |

FOREIGN PATENT DOCUMENTS

GB 2081332 A * 2/1982 ............... E04B 5/55

OTHER PUBLICATIONS

Oberon Wireless Communications Solutions, Product Catalog 2010, "Secure Infrastructure Solutions for Wireless Networks," © 2009 Oberon Inc. Copyright (40 pages), 2009.

* cited by examiner

*Primary Examiner* — Alfred J Wujciak
(74) *Attorney, Agent, or Firm* — Baker Botts L.L.P.

(57) ABSTRACT

An apparatus that includes a support beam that spans a distance along a first surface of a planar object. The apparatus also includes a mounting bracket that includes a channel shaped to receive at least a portion of the support beam to suspend the mounting bracket from the support beam. The mounting bracket also includes at least one mounting point configured to attach the mounting bracket to an electronic device. The apparatus further includes a trim bezel configured to attach to the electronic device. The trim bezel includes a trim bezel surface. The apparatus additionally includes a set screw coupled to the channel and the support beam. The set screw is configured to adjust a gap between the mounting bracket and the support beam to adjust the bezel surface with respect to a second surface of the planar object.

14 Claims, 4 Drawing Sheets

US 8,632,040 B2

1

LOW PROFILE MOUNTING OF ELECTRONIC DEVICES

TECHNICAL FIELD

The present disclosure relates generally to mounting devices.

BACKGROUND

As more wireless networking devices become available, the need for access points increases. One common place for installing access points is ceilings. Access points placed in ceilings may provide wireless coverage that blankets an entire building or section of a building. Other devices, such as security cameras and motion detectors, may also be placed in ceilings.

BRIEF DESCRIPTION OF THE FIGURES

For a more complete understanding of particular embodiments and their advantages, reference is now made to the following description, taken in conjunction with the accompanying drawings, in which.

DESCRIPTION

Overview

The teachings of the present disclosure relate to an apparatus that includes a support beam configured to span a support distance along a first surface of a planar object. The apparatus also includes a mounting bracket. The mounting bracket includes a channel shaped to receive at least a portion of the support beam to suspend the mounting bracket from the support beam as the support beam spans the distance along the first surface. The mounting bracket also includes at least one mounting point configured to attach the mounting bracket to an electronic device. The apparatus further includes a trim bezel configured to attach to the electronic device. The trim bezel includes a trim bezel surface. The apparatus additionally includes a set screw coupled to the channel and the support beam. The set screw is configured to adjust a gap distance between the mounting bracket and the support beam to adjust the bezel surface with respect to a second surface of the planar object.

Description of Example Embodiments

Figure 1:
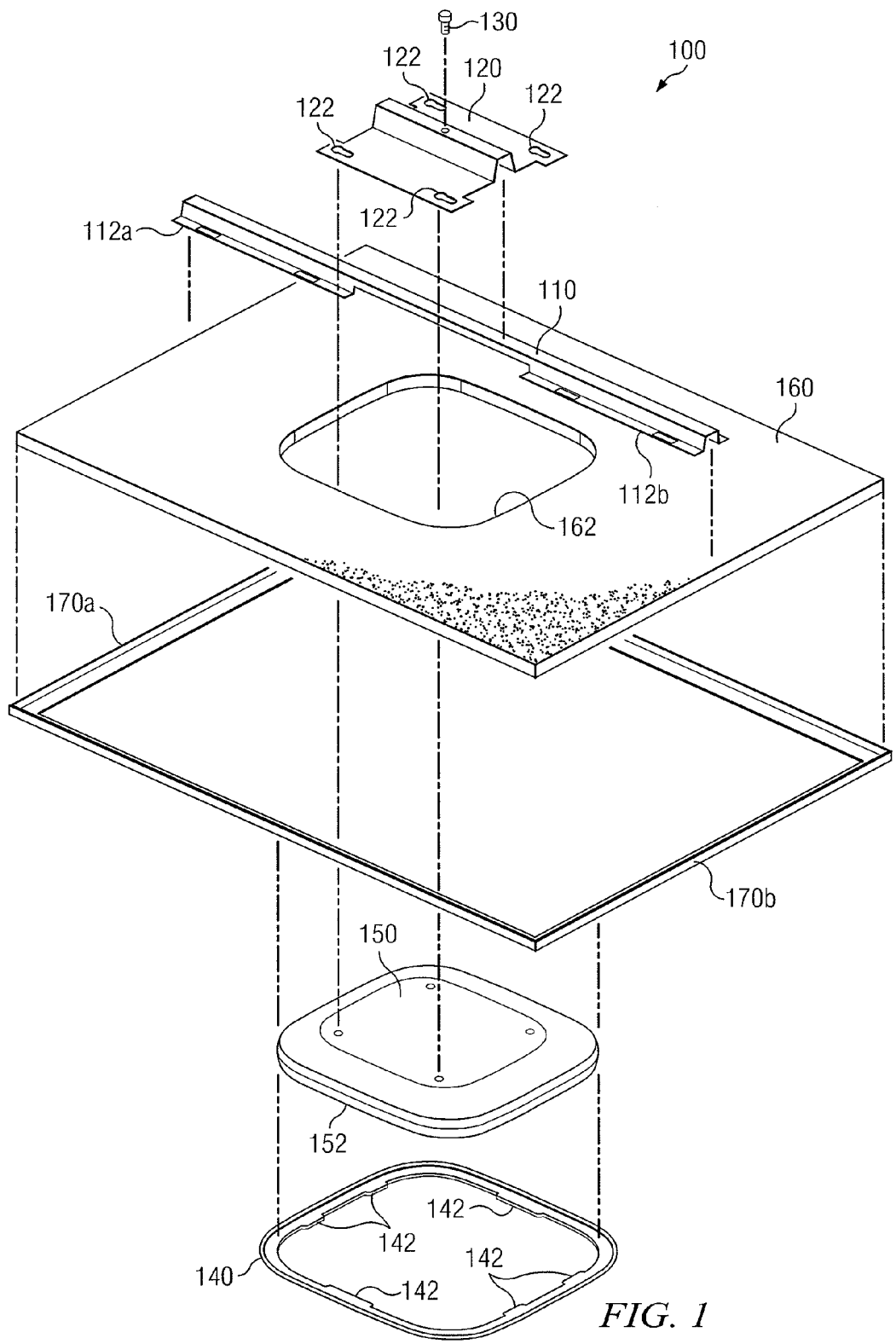
FIG. 1 illustrates an exploded perspective view of a low profile mount for an electronic device, in accordance with particular embodiments.

FIG. 1 illustrates an exploded perspective view of a low profile mount for an electronic device, in accordance with particular embodiments. In the depicted embodiment, low profile mount 100 is configured to mount an electronic device, such as a wireless access point, to a ceiling. Low profile mount 100 includes support beam 110, mounting bracket 120, set screw 130, and trim bezel 140. As will be discussed in more detail below, mounting bracket 120 and trim bezel 140 attach to electronic device 150. Mounting bracket 120 further attaches to support beam 110 such that when set screw 130 is rotated in a particular direction (e.g., clockwise) set screw 130 raises mounting bracket 120, electronic device 150, and trim bezel 140 towards ceiling tile 160. In certain embodiments, set screw 130 may be rotated until an outside edge of trim bezel 140 is flush against ceiling tile 160. Particular embodiments of low profile mount 100 may allow electronic device 150 to be mounted with a lower profile, as compared to mounting electronic device 150 directly to ceiling tile 160, while also providing an aesthetically pleasing appearance. This may be done with a relatively small amount of labor and capital expenditure.

A typical ceiling tile support grid is a grid of supports (e.g., ceiling supports 170a and 170b) that typically cover, and are a part of, the ceiling of buildings. The support grid is designed to hold numerous ceiling tiles (e.g., acoustical ceiling tiles) in a way that allows easy access to an open space above the top surface of the ceiling tiles. This open space is often used to run ducting, cabling, and other necessary, but unsightly, items used in modern buildings.

In particular embodiments, support beam 110 may be configured to span the distance between two ceiling supports 170a and 170b of a typical ceiling tile support grid. Depending on configuration, support beam 110 may be longer, shorter, or approximately equal to the distance between ceiling supports 170a and 170b. In particular embodiments, support beam 110 may be between approximately 20 and 30 inches. For example, in some embodiments, support beam 110 may be approximately 24 inches. Support beam 110 may reside in the open space above the ceiling tiles. Depending on the embodiment or configuration, support beam 110 may be in contact with a top surface of ceiling tile 160, ceiling supports 170, or a combination of both. For example, in some embodiments, support beam 110 may comprise grips 112 which comprise several protrusions designed to pierce and grip the top surface of ceiling tile 160. In some embodiments, support beam 110 may be slightly longer than a distance between ceiling supports 170a and 170b. This may allow support beam 110 to rest on ceiling supports 170. In particular embodiments, support beam 110 may further comprise a coupling device (e.g., a screw or a clasp) that attaches the ends of support beam 110 to ceiling supports 170.

In certain embodiments, ceiling opening 162 may allow electronic device 150 and mounting bracket 120 to reach support beam 110. For example, opening 162 may expose a portion of support beam 110 through ceiling tile 160. As set screw 130 is adjusted, mounting bracket 120 and electronic device 150 may be raised through ceiling opening 162. As electronic device 150 rises within opening 162 toward support beam 110, the visible profile of low profile mount 100 and electronic device 150 are reduced. Depending on the configuration, ceiling opening 162 may be created prior to attaching mounting bracket 120 to support beam 110. The size and shape of ceiling opening 162 may be selected with respect to the size and shape of the portion of electronic device 150 that is to pass through ceiling tile 160. In particular embodiments, ceiling opening 162 may be larger than the portion of electronic device 150 that is to be mounted above the bottom of ceiling tile 160 and smaller than the outside edge of trim bezel 140. This may allow electronic device 150 to pass through opening 162 while also allowing trim bezel 140 to conceal opening 162. In some situations, because trim bezel 140 conceals opening 162, the opening 162 need not be perfectly shaped.

In certain embodiments, to determine the size and shape of ceiling opening 162, trim bezel 140 may be used as a template. For example, the outside edge of trim bezel 140 may be traced to determine a maximum size of ceiling opening 162. In many situations, ceiling opening 162 may be slightly smaller than the outside edge of trim bezel 140 to allow trim bezel 140 to conceal ceiling opening 162 when low profile mount 100 is installed. For example, in certain situations, in addition to tracing the outside edge of trim bezel 140, at least a portion of the inside edge of trim bezel 140 may be traced. Ceiling opening 162 may then be sized somewhere between the tracings for the inside and outside edges of trim bezel 140.

Mounting bracket 120 may couple electronic device 150 with support beam 110. The coupling between electronic device 150 and mounting bracket 120 may include any of a variety of known techniques for attaching a bracket to a device, including, but not limited to, screws, bolts, nuts, washers, or key-slots. In particular embodiments, mounting bracket 120 may comprise a channel configured to receive at least a portion of support beam 110. For example, the channel may comprise an inverted "U" shape in which support beam 110 would be received in the upper rounded end opposite the lower open end of the inverted "U" shape. In some embodiments, the depth of the channel may be greater than the thickness of support beam 110. In these embodiments, mounting bracket 120 may be securely attached to electronic device 150. Mounting bracket 120 and electronic device 150 may be vertically adjusted while suspended from support beam 110. In some embodiments, the top surface of mounting bracket 120 may be substantially flat, without a raised channel. In such embodiments, mounting bracket 120 may rely on one or more set screws, such as set screw 130, to suspend mounting bracket 120 and electronic device 150 from support beam 110.

In particular embodiments, mounting bracket 120 may comprise preconfigured mounting points 122. The preconfigured mounting points may correspond to similar mounting points on electronic device 150. For example, in some embodiments, mounting bracket 120 may comprise four holes that align in size and location with four holes of electronic device 150. The holes may be aligned to allow four screws to be inserted to attach mounting bracket 120 to electronic device 150. In some situations, mounting bracket 120 may be placed over support beam 110 before mounting bracket 120 may be attached to electronic device 150. This may be because once mounting bracket 120 has been attached to electronic device 150, it may be difficult to suspend mounting bracket 120 from support beam 110. For example, the channel may be closed on four sides which may prevent placement of mounting bracket 120 over support beam 110.

In certain embodiments, mounting bracket 120 may comprise a security feature (not illustrated). The security feature may allow an anti-theft or theft-deterrent device to be attached to the mounting bracket 120. For example, a lock may be attached to the security feature of the mounting bracket. The lock may be coupled to a permanent structure of the building to tether the mounting bracket and/or the electronic device to the building.

As mentioned above, set screw 130 may be used to adjust the distance between electronic device 150 and support beam 110. For example, if set screw 130 is turned one direction (e.g., clockwise), electronic device 150 may move towards support beam 110. Conversely, if set screw 130 is turned in an opposite direction (e.g., counter-clockwise), electronic device 150 may move away from support beam 110. In particular embodiments, set screw 130 may comprise a thumb screw that can be adjusted by hand.

Set screw 130 may rest against a top surface of support beam 110, or set screw 130 may, at least partially, pass through support beam 110. For example, if mounting bracket 120 includes a channel, the channel may comprise a female threaded hole that corresponds to the thread of set screw 130. Thus, as set screw 130 is rotated in one direction or another, set screw 130 raises or lowers mounting bracket 120 as set screw 130 pushes against the top surface of support beam 110.

Trim bezel 140 may take any of a variety of sizes, shapes, or configurations based on the size, shape, or configuration of electronic device 150. In some embodiments, trim bezel 140 may be attached to electronic device 150 such that a portion of electronic device 150 is above trim bezel 140 and a portion of electronic device 150 is below trim bezel 140. The manner in which trim bezel 140 attaches to electronic device 150 may vary depending on the configuration of electronic device 150. For example, electronic device 150 may comprise a clamshell design in which there is a seam 152 around the periphery of electronic device 150. Seam 152 may be where the two portions of the clamshell meet. For this type of electronic device, particular embodiments of trim bezel 140 may include multiple tabs 142 along an inside edge of trim bezel 140. Tabs 142 may be configured to fit within seam 152 of electronic device 150.

In some embodiments, the inside edge of trim bezel 140 may closely match the shape of the periphery of electronic device 150. In these embodiments, trim bezel 140 may be securely attached to electronic device 150 such that there are no significant gaps between trim bezel 140 and electronic device 150. In these embodiments, trim bezel 140 may be deflected slightly to get tabs 142 into seam 152.

In some embodiments, electronic device 150 may not comprise a seam or the seam may be in an undesirable location. In these embodiments, trim bezel 140 may be attached to electronic device 150 via alternate means. For example, tabs 142 may extend up, along the side of electronic device 150 (as opposed to out, into the side of electronic device 150). In this situation, tabs 142 may comprise a screw hole through which a screw may be inserted to attach trim bezel 140 to electronic device 150.

Once trim bezel 140 is attached to electronic device 150, electronic device 150 may be raised through ceiling opening 162. Electronic device 150 may be raised until trim bezel 140 rests against the exposed bottom surface of ceiling tile 160. This may allow trim bezel 140 to conceal ceiling opening 162. Set screw 130 may be adjusted to apply force from trim bezel 140 to ceiling tile 160 to secure electronic device 150 in place.

In certain embodiments, trim bezel 140 may comprise an angled surface. In these embodiments, the outside edge may be at a different height relative to the inside edge (see FIGS. 2A and 2B). This may provide structural rigidity to trim bezel 140 as well as provide a more aesthetically pleasing transition from seam 152 of electronic device 150 to ceiling tile 160. The height of trim bezel 140 may also provide a stop to ensure that each electronic device 150 is installed to the same depth.

Figure 2A:
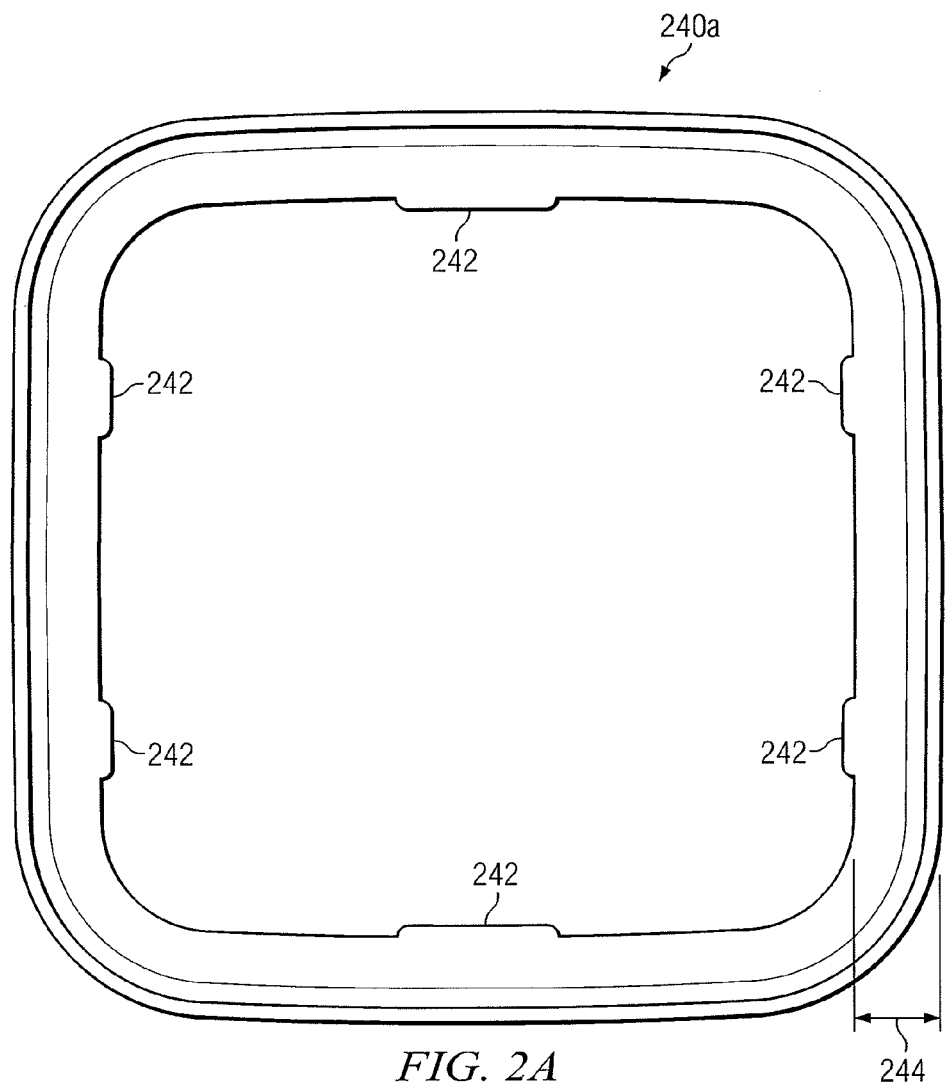
FIG. 2A illustrates an overhead view of a trim bezel used with a low profile mount for an electronic device, in accordance with particular embodiments.
Figure 2B:
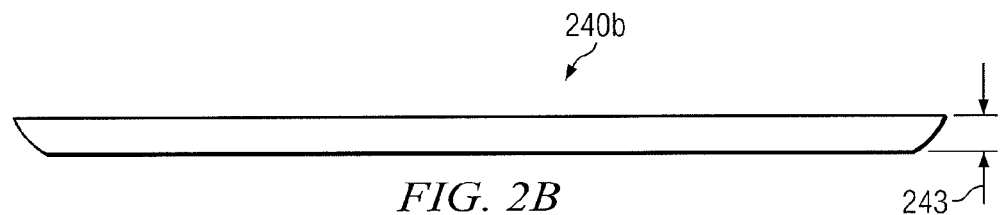
FIG. 2B illustrates a side view of a trim bezel used with a low profile mount for an electronic device, in accordance with particular embodiments.

FIG. 2A and FIG. 2B illustrates an overhead view and a side view, respectively, of a trim bezel used with a low profile mount for an electronic device, in accordance with particular embodiments. In the depicted embodiment, trim bezel 240 is designed to attach to a seam of an electronic device, such as a wireless access point, a surveillance camera, or any other electronic device for which a low profile mount is suitable.

Trim bezel 240 includes tabs 242 distributed around an inside edge of trim bezel 240. Tabs 242 are long enough to fit within the seam of the electronic device and securely hold trim bezel 240 in place. For example, in certain embodiments, tabs 242 may be between approximately 0.001 and 1 inches.

For example, in some embodiments, tabs 242 may be approximately 0.04 inches. The length of tabs 242 may be based on numerous factors, some of which may include bezel width 244, the width of tabs 242, the material used to make bezel 240, and/or a desired amount of shear force. The shape and size of the inside edge of trim bezel 240 may closely match the shape and size of the periphery of the electronic device. This may help to avoid creating gaps between trim bezel 240 and the electronic device. In particular embodiments, force may be applied to one or more portions of trim bezel 240 in order to deflect tabs 242 a certain amount. The deflection may allow tabs 242 to be inserted into the seam of the electronic device. In certain embodiments, trim bezel 240 may be made of a rigid material that can be deflected and returns to its original shape once the deflection force is no longer applied. For example, in some embodiments trim bezel 240 may be made of sheet metal, aluminum, or stainless steel.

In particular embodiments, trim bezel 240 may be attached to the electronic device without having to disassemble the electronic device. Furthermore, because tabs 242 fit within an existing seam in the electronic device, attaching trim bezel 240 may not cause any cosmetic damage to the external appearance of the electronic device. In some situations, trim bezel 240 may be an aftermarket component that may be attached to an electronic device by a user after the user purchases the electronic device.

Trim bezel 240 has a bezel width 244 and a bezel height 243. The length of bezel width 244 and bezel height 243 may vary depending on factors including the intended mounting location and the functions and features of the electronic device. In particular embodiments, bezel width 244 may be long enough to provide an adequate margin of error when creating the opening in the ceiling tile. For example, in particular embodiments, bezel width 244 may be between approximately 0.2 and 2 inches. For example, in particular embodiments bezel width 244 may be approximately 0.5 inches. In particular embodiments, bezel height 243 may be based on factors such as the portion of the electronic device to be below the ceiling tile or the thickness of the electronic device. For example, bezel height 243 may be between approximately 0.03 and 1 inches. For example, in some embodiments, bezel height 243 may be approximately ⅛ of an inch.

In addition to the features above, bezel width 244 and bezel height 243 may help improve the structural strength of trim bezel 240. This may allow the set screw to be tightened without bending or otherwise damaging trim bezel 240.

Figure 3:
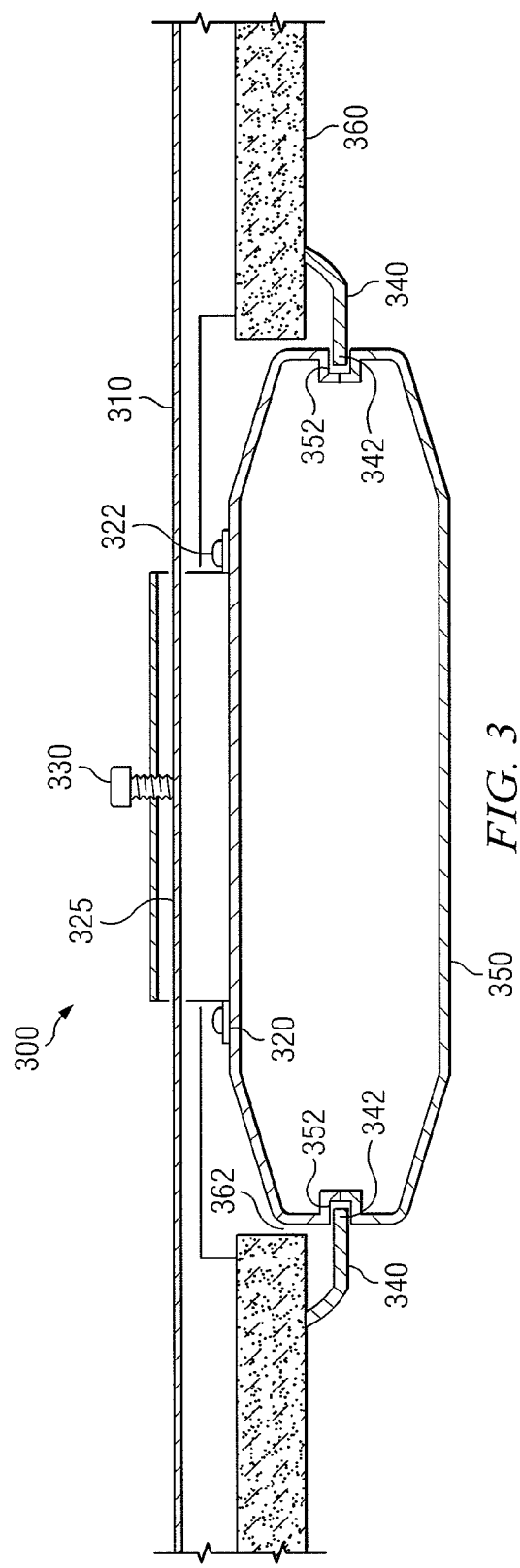
FIG. 3 illustrates a cutaway profile view of an installed low profile mount for an electronic device, in accordance with particular embodiments.

FIG. 3 illustrates a cutaway profile view of an installed low profile mount for an electronic device, in accordance with particular embodiments. In FIG. 3, electronic device 350 is mounted to a ceiling using support beam 310, mounting bracket 320, set screw 330, and trim bezel 340.

In certain embodiments, low profile mount 300 allows at least a portion of electronic device 350 to be above the exposed bottom surface of ceiling tile 360. This may reduce the perceived profile of electronic device 350, increasing the aesthetic value of electronic device 350 when installed with ceiling tile 360. The aesthetic value may be further increased by trim bezel 340. Trim bezel 340 may fit securely around the periphery of electronic device 350 to provide a smooth transition from electronic device 350 to ceiling tile 360.

In the depicted embodiment, tabs 342 fit within seam 352 of electronic device 350 to attach trim bezel 340 to electronic device 350. By adjusting set screw 330, electronic device 350 may be raised through opening 362 until trim bezel 340 is pushing against ceiling tile 360. In particular embodiments, the length of set screw 330 may be between approximately 0.5 and 2 inches. This may allow low profile mount 300 to work with a range of thicknesses commonly used for ceiling tile 360.

In the depicted embodiment, mounting bracket 320 is attached to electronic device 350 via mounting points 322. Mounting bracket 320 includes channel 325 which allows mounting bracket 320 to be suspended from support beam 310. In some embodiments, there may be a gap between the bottom of support beam 310 and the top of electronic device 350. As set screw 330 is rotated, the threads of set screw twist within corresponding threads in the top of channel 325. This may cause mounting bracket 320 to either rise or drop, depending on which direction set screw 330 is rotated.

The components of low profile mount 300 may be used with existing electronic devices 350. That is, the components of profile mount 300 may be designed to be attached to electronic device 350 after market. In particular embodiments, mounting bracket 320 and/or support beam 310 may be made of sheet metal.

Thus far, several different embodiments and features have been presented. While the depicted embodiments have illustrated substantially square electronic devices, different embodiments may include different shaped electronic devices. Moreover, while the depicted low profile mounts have been attached to ceiling tiles, the low profile mount may be attached to any planar object, whether vertical or horizontal. Particular embodiments may combine one or more features depending on operational needs and/or component limitations. This may allow for great adaptability to the needs of various organizations and users. Some embodiments may include additional features.

Figure 4:
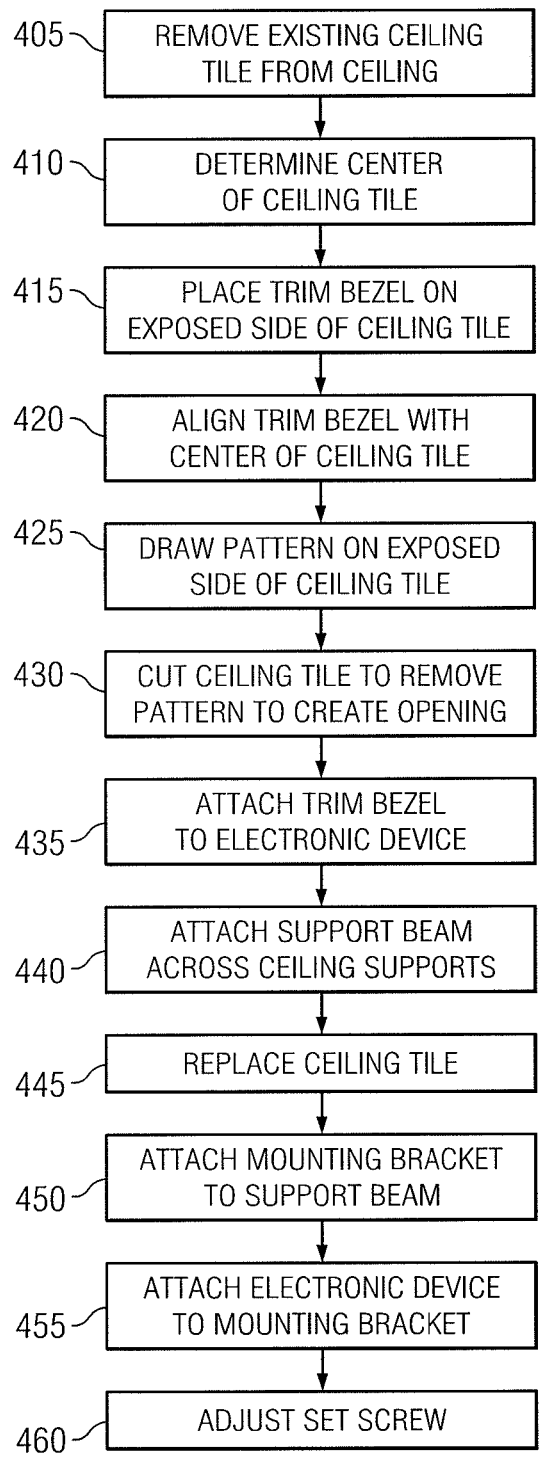
FIG. 4 illustrates a method for mounting an electronic device, in accordance with particular embodiments.

FIG. 4 illustrates a method for mounting an electronic device, in accordance with particular embodiments. The method begins at step 405 with the removal of an existing ceiling tile from a ceiling. The removed ceiling tile may or may not have a traditionally mounted electronic device attached thereto. The ceiling, from which the ceiling tile is removed, may comprise a plurality of ceiling tiles, such as acoustic ceiling tiles. The ceiling tiles may mask an open space above the ceiling tile used to run duct work, cablings and other unsightly components for a building.

At step 410, a target point, such as the center of the ceiling tile, is determined. This may be done in any suitable manner. For example, lines may be drawn from diagonal corners. The intersection of the lines may generally designate the center of the ceiling tile.

At step 415, a trim bezel may be placed on the exposed side of the ceiling tile. The exposed side of the ceiling tile may be visible from the room when the ceiling tile is installed in the ceiling.

At step 420, the trim bezel is aligned with the center of the ceiling tile. The trim bezel may be aligned such that the center of the ceiling tile is aligned with the center of the trim bezel.

At step 425, a pattern is drawn on the exposed side of the ceiling tile. The pattern may be drawn by tracing an outside edge of the trim bezel to yield an outer marking. In certain embodiments, the inside edge, or at least a portion thereof, of the trim bezel may be traced to yield an inner marking. One or more markers may provide a guide, or pattern, from which an opening may be made in the ceiling tile.

At step 430, the ceiling tile is cut to create an opening. The opening may be based on the pattern traced on to the exposed side of the ceiling tile. In some embodiments, where only the outside edge of the trim bezel is traced, cutting the ceiling tile may comprise cutting a short distance in from the drawn line. For example, the ceiling tile may be cut at least approximately ⅛ of an inch (the amount may vary depending on the width of the bezel) in from the tracing of the outside edge of the trim bezel. This may ensure that there is a portion of ceiling tile available for the trim bezel to rest against when adjusted at step 460. In particular embodiments, the opening may be made smaller than the outside edge of the trim bezel (so that the trim bezel conceals the opening) and larger than the inside edge of the trim bezel (so that at least a portion of the electronic device is able to pass through the opening). This may reduce the profile of the electronic device that is exposed to users on the floor.

At step 435, the trim bezel is attached to an electronic device in any suitable manner. In particular embodiments, the trim bezel may comprise a plurality of tabs arranged around an inside edge of the trim bezel. An installer may apply force to one of the sides of the trim bezel to deflect the side. The deflection may be enough to allow the tabs to fit into a seam along the periphery of the electronic device. In certain embodiments, the trim bezel may be attached to the electronic device through, for example, screws.

At step 440, a support beam is attached across ceiling supports. The ceiling supports may be part of a grid of supports from which ceiling tiles are supported. The support beam may be long enough that it spans two supports of the ceiling support. In particular embodiments, attaching the support beam may further comprise attaching a plurality of claws located on a bottom surface of the support beam. The claws may be hammered into the ceiling tile to provide grip. In some embodiments, the support beam may be attached to the ceiling supports by screws or clasps or it may rest along or across the ceiling supports.

At step 445, once the support beam is in place, the ceiling tile is replaced. In some embodiments, the ceiling tile may be replaced before the support beam is attached across the ceiling supports.

At step 450, a mounting bracket is attached to the support beam. In some embodiments, the mounting bracket may comprise a raised channel that fits over the support beam, which may allow the mounting bracket to be suspended from the support beam.

At step 455, an electronic device is attached to the mounting bracket. In particular embodiments, the mounting bracket may be screwed to the bottom of the electronic device.

At step 460, once the electronic device is attached to the mounting bracket, a set screw may be adjusted to bring the trim bezel flush against the ceiling tile. The set screw may pass through the mounting bracket and rest against a top surface of the support beam. When the set screw is rotated in one of two directions, the electronic device may raise or lower. The set screw may be adjusted until the outside edge of the trim bezel is flush against the ceiling tile. This may secure the electronic device in place within the ceiling tile as well as provide users on the floor with an aesthetically pleasing look when viewing the electronic device.

Some of the steps illustrated in FIG. 4 may be combined, modified or deleted where appropriate, and additional steps may also be added to the flowchart. Additionally, steps may be performed in any suitable order without departing from the scope of particular embodiments.

Technical advantages will be readily apparent to one of ordinary skill in the art from the figures, descriptions, and claims provided herein. Moreover, while specific advantages have been enumerated above, various embodiments may include all, some, or none of the enumerated advantages.

Although particular embodiments have been described in detail, it should be understood that various other changes, substitutions, combinations and alterations may be made hereto without departing from the spirit and scope of the disclosure. For example, although embodiments have been described with reference to mounting an electronic device to a ceiling, particular embodiments may be mounted to a wall. In addition, any of the elements depicted herein may be provided as integrated internal or separate external components to each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed:

1. An apparatus for suspending an electronic device:
a support beam configured to span a support distance along a first surface of a ceiling tile, the support beam comprises at least one claw configured to grip the first surface of the ceiling tile;
a mounting bracket comprising:
a channel shaped to receive at least a portion of the support beam to suspend the mounting bracket from the support beam as the support beam spans the support distance along the first surface of the ceiling tile; and
at least one mounting point configured to attach the mounting bracket to the electronic device such that the support beam passes between the channel of the mounting bracket and the electronic device;
a trim bezel configured to attach to the electronic device and comprising a plurality of tabs configured to be disposed within a seam along a periphery of the electronic device, the trim bezel comprising a trim bezel surface that extends a bezel width out and a bezel height up from an inner edge of the trim bezel to an outer edge of the trim bezel, the inner edge configured to abut the electronic device; and
a set screw coupled to the channel of the mounting bracket and abutting the support beam, wherein adjusting the set screw adjusts a gap distance between the mounting bracket and the support beam, and wherein adjusting the gap distance adjusts at least a portion of the electronic device from below a second surface of the ceiling tile to above the second surface for a variety of thicknesses of the ceiling tile.

2. An apparatus for suspending an electronic device:
a support beam configured to span a support distance along a first surface of a planar object;
a mounting bracket comprising:
a channel shaped to receive at least a portion of the support beam to suspend the mounting bracket from the support beam as the support beam spans the support distance along the first surface of the planar object;
first and second flanges extending from substantially opposite sides of the channel;
a plurality of mounting points configured to attach the electronic device to the mounting bracket, the plurality of mounting points comprising:
at least one mounting point configured to attach the first flange to the electronic device; and
at least one mounting point configured to attach the second flange to the electronic device;

wherein the support beam passes between the channel of the mounting bracket and the electronic device when the electronic device is attached to mounting brackets;

a trim bezel configured to attach to the electronic device and comprising a trim bezel surface; and a set screw coupled to the channel of the mounting bracket and abutting the support beam, wherein adjusting the set screw adjusts a gap distance between the mounting bracket and the support beam, and wherein adjusting the gap distance adjusts a distance between the trim bezel surface and the first surface of the planar object in a direction substantially orthogonal to the first surface of the planar object.

3. The apparatus of claim 2, wherein the trim bezel comprises a plurality of tabs configured to be disposed within a seam along a periphery of the electronic device.

4. The apparatus of claim 2, wherein:
the trim bezel comprises an inner edge and an outer edge, the inner edge attached to the electronic device; and
the trim bezel surface extends a bezel width out from the inner edge to the outer edge and a bezel- height up from the inner edge to the outer edge, the bezel height and the bezel width both greater than zero.

5. The apparatus of claim 2, wherein the support beam comprises at least one claw configured to grip the first surface of the planar object.

6. The apparatus of claim 2, wherein the planar object comprises a ceiling tile.

7. The apparatus of claim 2, wherein the mounting bracket comprises a receptacle configured to receive a locking mechanism.

8. The apparatus of claim 2, wherein the electronic device is a wireless access point.

9. The apparatus of claim 2, wherein the trim bezel is made of a rigid material configured to deflect to attach the trim bezel to the electronic device.

10. The apparatus of claim 2, wherein adjusting the gap distance further moves at least a portion of the electronic device from below a second surface of the planar object to above the second surface for a variety of thicknesses of the planar object.

11. The apparatus of claim 2, wherein the trim bezel comprises an inside edge configured to completely receive an entire periphery of the electronic device.

12. The apparatus of claim 2, wherein the trim bezel comprises an outside edge configured to be disposed flush against the second surface of the planar object.

13. The apparatus of claim 2, wherein the support beam comprises a fixed length greater than the support distance, the support distance being between two ceiling supports of a ceiling support grid.

14. The apparatus of claim 2, wherein the support beam comprises a plurality of threaded openings configured to receive the set screw.

* * * * *